UNITED STATES PATENT OFFICE.

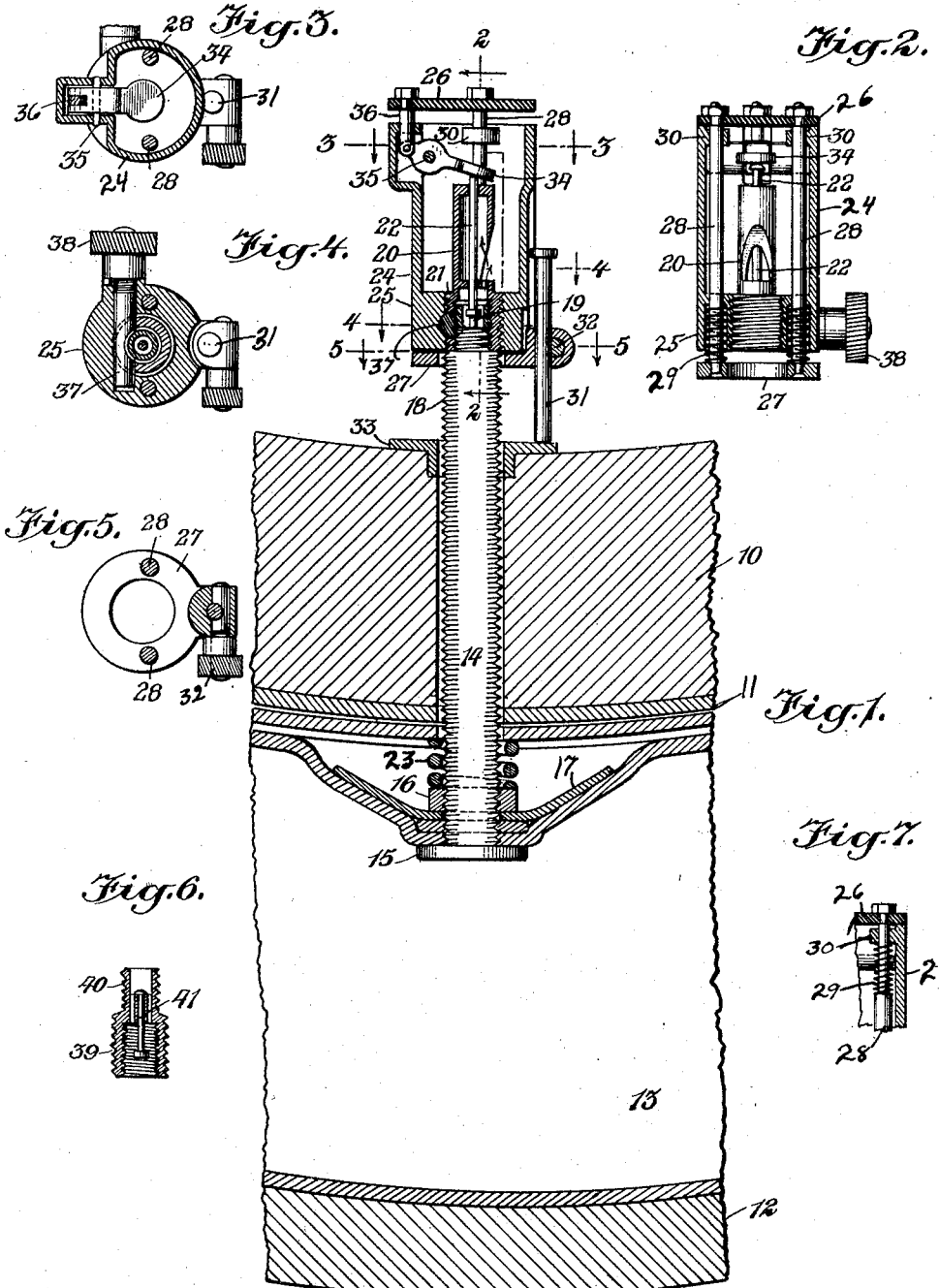

FREDERICK E. HAFELFINGER, OF WEEHAWKEN, NEW JERSEY.

WARNING-SIGNAL FOR TIRE DEFLATION.

1,389,655.  Specification of Letters Patent.  Patented Sept. 6, 1921.

Application filed August 11, 1920. Serial No. 402,794.

*To all whom it may concern:*

Be it known that I, FREDERICK E. HAFELFINGER, a citizen of the United States, and resident of Weehawken, in the county of Hudson and State of New Jersey, have invented certain new and useful Improvements in Warning-Signals for Tire Deflations, of which the following is a specification.

This invention relates to warning signals primarily designed for giving a noticeable indication when the automobile tire with which the device is used becomes deflated to a predetermined limit.

I am aware that devices for this general purpose and including a whistle blown by air escaping from the tire have been heretofore designed but, so far as I know, they have not proved practical and successful. I seek to overcome the objections to previous devices by providing a construction which may be readily attached to any Schrader valve stem without necessitating any change whatsoever in the latter; and is interchangeable whereby it may be applied or removed as easily and quickly as the ordinary valve stem cap or dust cap, in place of both of which my improved construction is employed.

As an important feature of my preferred form, I utilize the ordinary tire valve for normally retaining the air and thus do not need any other valves, washers, gaskets or the like for retaining the air pressure. Thus I eliminate the possibility of leakage of air when the signaling device is attached or removed, and permit of the removal of the device for purposes of testing the tire air pressure with the usual gage at any time desired. The removal or replacement of the device does not in any way disturb the usual air valve and thus does not cause any air leakage.

As a further important feature, I provide means whereby the usual valve stem is moved endwise through the wheel rim when the tire is deflated to the predetermined extent and I utilize this movement of the tire valve stem for the opening of the air valve and the operating of the signal.

As a further important feature, I provide means for operating the signal including a pair of relatively movable members, one being normally rigid in respect to the valve stem and the other normally rigid in respect to the wheel rim. The relative movement of the valve stem and the felly effects the relative movement of these parts and the operation of the signal.

As a further important feature, I provide means whereby the endwise movement of the valve stem results in a greater movement of a valve opening member in the same direction whereby the valve is opened as the valve stem moves inwardly against the decreased air pressure in the tire.

As a further important feature, I utilize the pneumatic signal, which is preferably in the form of a whistle, as means for carrying and supporting the valve opening device.

My improved signal can be made to operate at any degree of deflation desired corresponding to the size of the tire on which it is employed, the critical pressure being determined by the strength of the spring which operates the valve stem against the tire pressure.

In my improved device the whistle is entirely concealed from view and protected from mud, dust, etc., by an outer shell or cover and as one important feature of my invention I automatically open this shell or cover to permit the escape of the signaling sound at the same time that the tire valve is opened to blow the whistle. All of the working parts for opening the air valve are also concealed and protected by the same cover. My improved device is used in place of the usual dust cap and valve stem cap and is as easily removed as either of these members usually employed. The device is so constructed that it may be very easily rendered inoperative so as to stop the loss of air from the tire in case there is a slow leak and it is necessary or desirable to run any considerable distance on the partially deflated tire. The use of the partially deflated tire does not in any way injure or materially affect the signaling device.

In the accompanying drawings I have illustrated one form which my invention may assume but it will, of course, be evident that various changes may be made in the construction and operation within the scope of my invention as defined in the appended claims.

In these drawings:

Figure 1 is a central longitudinal section through a portion of a vehicle rim and tire with my improved device attached and with the parts in signaling position;

Fig. 2 is a longitudinal section of a signal taken on the line 2—2 of Fig. 1 and showing the parts in normal position;

Figs. 3, 4 and 5 are transverse sections on the lines 3—3, 4—4 and 5—5 respectively of Fig. 1;

Fig. 6 is a longitudinal section of a valve stem extension which may be employed; and Fig. 7 shows an alternative arrangement of spring mounting.

I have illustrated my invention as used in connection with a vehicle wheel having the usual wood felly 10, metalic rim 11 and tire including the tire shoe or casing 12 and the inflatable inner tube 13. This tube has a valve stem 14 secured thereto by a suitable flange 15 and nut 16 and between the two may be the usual guard plate 17. Within the valve stem is shown the usual Schrader valve with its inside valve stem 19 terminating at or adjacent to the upper end of the main tire valve stem 14. This stem 19 may be depressed to open the inside valve for inflation or pressure testing, in the usual manner. The parts so far described form no portion of my present invention and may, therefore, be varied within wide limits.

In the form of my improved construction illustrated in the drawings, I provide a signal in the form of a whistle 20. This may be of any desired shape or construction depending upon the character of the sound which it is desired to produce. Where the tire air pressure is used for directly operating the signal, it may be of other pneumatically operated form than the simple whistle shown. The whistle is shown as having an enlarged threaded base portion 21 which directly screws on to the usual threaded reduced end of the valve stem 14. For opening the air valve to blow the whistle, there is provided a plunger member 22 extending lengthwise through the sound chamber of the whistle, the latter being mounted preferably in alinement with the valve stem 14. This plunger member is guided in apertures in the opposite end walls of the sound chamber of the whistle and may have its ends slightly enlarged to limit the endwise movement of the member and also to provide bearing surfaces of the proper size to engage with the tire valve member 19 and the operating member for the plunger.

To operate this reciprocatory air valve opening member when the tire has reached a predetermined degree of deflation, I preferably provide means for moving the valve stem 14 endwise upon such determined deflation and utilize such endwise movement for operating the member 22. To give the desired endwise movement of the valve stem 14, there is provided a spring 23 which is mounted inside of the tire casing between the guard plate 17 and the inner surface of the shoe. This spring is shown as being a coil spring, but such specific form is not essential. The spring is made comparatively strong and of limited range of movement. When the tire is properly inflated the spring is compressed to the maximum extent and the valve stem is forced outwardly through the felly and rim of the wheel to the usual or normal extent. If it is desired to operate the signal when the tire pressure drops to forty pounds, the spring 23 may be made of such strength that it will expand against a tire pressure of forty pounds or less, forcing the guard plate 17 inwardly to the position shown in Fig. 1 and thus pull the valve stem endwise through the felly and rim to the limited extent determined by the amount of expansion of the spring 23.

To utilize this endwise movement of the valve stem 14 to operate the member 22 and open the tire valve for blowing the whistle, I provide a pair of members, one normally rigid with the valve stem and the other normally rigid with a portion of the wheel, as for instance the felly. As shown, there is provided a tubular casing 24 substantially co-axial with the whistle and inclosing the latter. This casing 24 has one end 25 internally threaded to screw on to the externally threaded base portion 21 of the whistle, so as to be rigid with the latter. As shown, the casing is entirely carried by the whistle but this is of minor importance as the casing may be attached directly to the valve stem and carry the whistle. As the casing is rigid with the valve stem, any movement of the latter in respect to the wheel, felly or rim will give a corresponding movement of the casing. The other member which is normally rigid in respect to the wheel includes a casing cover plate 26 at the outer extremity of the casing 24 and a collar 27 encircling the outer valve stem 14 between the casing and the felly. These two members are rigidly connected by a pair of rods 28 which so space them that, when the cover plate 26 is in engagement with and closes the end of the casing 24, the collar 27 will be spaced from the opposite end 25 of the casing, as shown in Fig. 2. When the collar 27 is in engagement with the end 25 of the casing, the cover plate 26 will be spaced from the casing as shown in Fig. 1. Suitable springs are employed for normally holding the parts in the position shown in Fig. 2 and thereby keeping the interior of the casing closed substantially dust tight. I do not wish to be limited to any specific positioning of such springs, but preferably use coil springs 29 positioned between flanges 30 in which the rods 28 are guided and shoulders on the rods, as shown particularly in Fig. 7. The springs are thus concealed and protected within the casing. The springs may be mounted in sockets in the end wall 25 of the casing and engage with the upper side of the collar 27, as shown in Fig. 2.

For connecting this frame work including the cover plate 26, the rods 28 and the collar 27 to the wheel so as to hold them rigid during any endwise movement of the valve stem 14 into the tire, I provide a stop for engagement with the felly. As fellies vary in thickness and tire valve stems vary in length, this stop is preferably made adjustable. The collar 27 is shown as having a stop in the form of a rod 31 mounted substantially parallel to the valve stem 14 of the tire. This rod is clamped to the collar 27 by a clamping screw 32 so that the rod and collar may be locked rigid in respect to each other. In applying the device to the valve stem after the tire is fully inflated, the casing is screwed on to the valve stem and then the rod 31 is loosened, pushed endwise until it engages with the felly 10 or a washer 33 on the latter and the screw 32 tightened. Now the stop will prevent the cover plate 26 and its connected parts from moving toward the felly when the valve stem 14, the whistle 20 and the casing 24 are moved by the spring 23 on a deflation of the tire.

To utilize this relative movement of the casing 24 and its cover 26 to open the tire valve, I provide suitable lever mechanism giving multiplied movement in the proper direction. I have shown a lever 34 mounted on a pivot pin 35 carried by the casing 24. One end of this lever normally engages with the end of the valve opener 22 and the other end is connected by a link 36 to the cover 26. The distance between the pivot pin 35 and the link 36 is very materially shorter than the distance between the pivot pin and the opposite operating end of the lever. Thus the operating end has a material greater range of movement than the operated end. As the pivot of the lever is connected to the casing and the operated end of the lever is connected through the link to the cover plate 26, it will be seen that any relative movement of the casing and cover plate will swing the lever. As the cover plate 26 is rigid with the tire felly and rim, any movement of the valve stem 14 under the influence of the spring 23 on deflation of the tire will move the pivot 35 of the lever 34 in respect to the stationary link 36. This downward movement of the pivot pin 35 will result in a very much greater downward movement of the operating end of the lever and this will push down the plunger 22 and open the tire valve.

From the foregoing, it will be seen that a reduction in the tire pressure to the point where the spring 23 can act, will pull the valve stem 14 down and open the tire valve and blow the whistle. In case the driver, after hearing the signal, desires to continue to run on the partially deflated tire, he may very easily prevent further loss of air pressure by merely loosening the retaining screw 32 for the stop 31. This will permit the stop 31 to be pushed up through the collar 27 and the springs 29 will restore the parts to normal position and stop the loss of air past the tire valve, assuming that the tire valve is in proper working order and that the original loss of air pressure was not due to a leaking condition of this valve. Instead of loosening the set screw 32 and the stop 31, the entire device may be removed from the valve stem and replaced by an ordinary valve cap or dust cap, or both. In order to prevent the device from working loose from the valve stem, any suitable clamping or locking device may be employed. Merely as an example, I have shown a transverse rod 37 mounted in the end 25 of the casing and intersecting the threaded passage which receives the end of the valve stem 14. The side of the rod 37 is correspondingly cut away and threaded. The outer end of this rod 37 is threaded and receives a thumb nut 38. By tightening this thumb nut an endwise pull on the rod 37 is exerted and it effectively binds the valve stem so that the casing cannot rotate on the latter.

In some vehicle wheels, the valve stem may be exceptionally short or the felly 10 may be exceptionally thick so that there is an insufficient amount of the valve stem projecting behind the surface of the felly to facilitate the mounting of the device thereon. In such a case, it is very easy to provide a valve stem extension which will receive the signaling device. In Fig. 6 I have shown such a valve stem including a base portion 39 externally threaded the same as the body of the valve stem 14 and internally threaded the same as the reduced top portion of the stem. On the outer end of this is a reduced portion 40 externally threaded the same as the reduced portion of the usual valve stem. Within the portion 40 is a transverse bar or spider carrying a plunger member 41 with enlarged ends for retaining it in place. When this valve stem extension is screwed on to the ordinary valve stem, one end of the plunger member 41 will rest on the stem 19 of the inside tire valve, while the other end is in position to receive the valve stem operating member 22. Ordinarily such a valve stem extension is not necessary but it can be provided wherever necessary. The adjustable stop 31 may be made of such length as to properly operate with a valve stem of the maximum length and a felly of the minimum thickness.

It will be noted that the cover member 26 serves a triple function in that it normally prevents access of dust or dirt to the interior of the casing containing the whistle and parts; it automatically opens to permit the escape of the sound from the whistle when the latter is operated; and by its movement relatively to the casing it opens the air valve. The whistle itself carries the valve operating member and the movement of the valve stem in one direction results in a similar but greater movement of the valve opening member in the same direction.

Having thus described my invention what I claim as new and desire to secure by Letters Patent is:

1. A signal for pneumatic tires, including a whistle adapted to be directly secured to the valve stem, means for moving the valve stem endwise upon a predetermined change in tire air pressure, and means carried by the whistle for opening the tire air valve to blow the whistle upon said predetermined valve stem movement.

2. A signal for pneumatic tires, including a whistle adapted to be secured to the tire valve stem and be operated by tire air pressure, a plunger member carried by the whistle and projecting therethrough for opening the tire air valve, and means for moving said member upon a predetermined drop in tire air pressure.

3. A tire signal, including a whistle adapted to be secured to the valve stem, a plunger member carried by said whistle and extending therethrough for opening the tire valve, and means for operating said plunger member upon a predetermined drop in tire pressure.

4. A tire signal, including a whistle adapted to be secured to the valve stem, a plunger member projecting through the whistle for opening the tire valve, means for moving the valve stem endwise upon a predetermined drop in tire pressure, and means for operating said plunger member upon said endwise movement of the valve stem and including a member normally rigid with the valve stem, a member normally rigid with the wheel, and lever connections between said three members.

5. In combination, a whistle adapted to be secured to a valve stem, a casing inclosing said whistle and having a cover member, and means for simultaneously opening said cover member and tire valve upon a predetermined drop in tire pressure.

6. In combination, a whistle adapted to be secured to a tire valve stem, a casing inclosing said whistle and having a separate cover member, a plunger for opening the tire valve, and connections between said casing, cover member and plunger member for opening the tire valve upon a relative opening movement of the casing and cover.

7. In combination, a whistle adapted to be secured to a valve stem, a casing inclosing said whistle and having a sound escape opening, a member for opening the tire valve, a cover for said opening, means for moving said cover to open position upon a predetermined drop in tire pressure, and means for operating said valve opening member upon an opening movement of said casing cover.

8. A tire signal including means for moving the valve stem endwise upon a predetermined drop in tire pressure, a member normally rigid with the valve stem, a member normally rigid with the wheel, a member for opening the tire valve, and a lever connecting said three members and serving to move the valve opening member in the same direction and through a greater range of movement than said valve stem upon the endwise movement of the latter.

9. A warning signal for indicating tire deflation, including a casing adapted to be secured to the valve stem, a signal, a member movable relatively to said casing for effecting operation of the signal, and an adjustable stop carried by said member and engaging with the felly.

10. A warning signal for indicating tire deflation, including a spring disposed within the tire casing and adapted to move the valve stem endwise against tire pressure upon a predetermined drop in tire pressure, a whistle secured to the tire valve stem, a valve opening member, and adjustable connections between said member and the felly for operating said member upon said valve stem movement.

11. A tire deflation indicating device, including a whistle adapted to be secured to the valve stem, a casing inclosing and spaced from said whistle, a cover member for said casing, a tire valve opening member, and a lever pivotally connected to said casing and having its opposite ends connected to said cover and said valve opening member whereby the relative opening movement of the casing and cover operates to open the tire valve.

12. A warning signal for indicating tire deflation, including means for moving the valve stem endwise upon a predetermined drop in tire pressure, a signal, and means for operating the signal upon said endwise movement of said valve stem and including two relatively movable members, one carried by the valve stem and movable therewith, and the other supported by said valve stem and limited in its movement by engagement with the felly.

13. A signal operating means adapted for use in connection with automobile pneumatic tires, including means for moving the tire valve stem against the tire air pressure upon a predetermined reduction in said pressure, and connections including a member directly secured to said valve stem and a member secured to and carried by said stem but adapted to abut against the felly to effect relative movement of said members and the operation of the signal upon said movement of the tire valve stem.

14. A signal operating means adapted for use in connection with automobile pneumatic tires, including means for moving the tire valve stem against the tire air pressure upon a predetermined reduction in said pressure, and mechanism secured to and carried solely by said valve stem and including a member movable with said valve stem, a member adapted to abut against the felly during said movement of the tire valve stem, and means for operating the signal upon said relative movement of said members.

15. A tire deflation signal including a whistle adapted to be directly secured to and carried by the valve stem, a plunger carried by and projecting through the whistle and adapted upon movement in one direction to open the tire valve; and means, operating upon a pre-determined drop in tire pressure, for operating said plunger.

Signed at New York in the county of New York and State of New York this 6th day of August A. D. 1920.

FREDERICK E. HAFELFINGER.